US009745046B2

(12) United States Patent
Harrison et al.

(10) Patent No.: US 9,745,046 B2
(45) Date of Patent: Aug. 29, 2017

(54) AIRCRAFT TRANSPARENCY WITH PRESSURE SEAL AND/OR ANTI-STATIC DRAIN

(71) Applicant: PPG INDUSTRIES OHIO, INC., Cleveland, OH (US)

(72) Inventors: Spencer B. Harrison, Huntsville, AL (US); James V. Hartmann, Huntsville, AL (US)

(73) Assignee: PPG Industries Ohio, Inc., Cleveland, OH (US)

(*) Notice: Subject to any disclaimer, the term of this patent is extended or adjusted under 35 U.S.C. 154(b) by 140 days.

(21) Appl. No.: 14/600,198

(22) Filed: Jan. 20, 2015

(65) Prior Publication Data
US 2015/0210375 A1    Jul. 30, 2015

Related U.S. Application Data

(60) Provisional application No. 61/933,576, filed on Jan. 30, 2014.

(51) Int. Cl.
*B64C 1/14* (2006.01)
*B64D 45/02* (2006.01)
*F16J 15/06* (2006.01)

(52) U.S. Cl.
CPC .......... *B64C 1/1492* (2013.01); *B64C 1/1484* (2013.01); *B64D 45/02* (2013.01); *F16J 15/064* (2013.01)

(58) Field of Classification Search
CPC .............................. B64C 1/1492; B64C 1/1484
See application file for complete search history.

(56) References Cited

U.S. PATENT DOCUMENTS

| 2,511,168 A | 6/1950 | Martin et al. |
| 2,939,186 A * | 6/1960 | Norwood .............. B64C 1/1492 188/181 R |
| 4,323,946 A | 4/1982 | Traux |

(Continued)

FOREIGN PATENT DOCUMENTS

| DE | 41 25 344 A1 | 2/1993 |
| DE | 10 2011 120 724 A1 | 6/2013 |

(Continued)

OTHER PUBLICATIONS

PCT Search Report, PCT/US2015/012132, dated Mar. 26, 2015.

*Primary Examiner* — Brian M O'Hara
*Assistant Examiner* — Michael Kreiner
(74) *Attorney, Agent, or Firm* — Julie W. Meder; Lester N. Fortney

(57) ABSTRACT

An aircraft transparency assembly includes an aircraft transparency having at least one ply having an outer surface and an extended portion. The assembly also includes a pressure seal configured to engage the extended portion of the ply, wherein the pressure seal includes a pressure seal body and at least one integrated compression stop. The transparency assembly can also include an anti-static drain assembly including at least one flexible conductive element having a first end in electrical contact with the outer surface of the ply, for example with an optional conductive coating on the outer surface of the ply, and a second end configured to contact the pressure seal.

19 Claims, 6 Drawing Sheets

(56) References Cited

U.S. PATENT DOCUMENTS

| | | | | |
|---|---|---|---|---|
| 4,823,229 | A | * | 4/1989 | Waterland, III ......... B60J 10/00 174/356 |
| 5,054,793 | A | | 10/1991 | Hauenstein et al. |
| 6,561,460 | B2 | * | 5/2003 | Rukavina .............. B64C 1/1492 244/129.3 |
| 2012/0228428 | A1 | | 9/2012 | Deganis et al. |
| 2015/0023764 | A1 | | 1/2015 | Lauer et al. |

FOREIGN PATENT DOCUMENTS

| | | |
|---|---|---|
| DE | 10 2012 206 626 A1 | 10/2013 |
| EP | 0 314 153 A2 | 5/1989 |
| EP | 2 562 078 A1 | 2/2013 |
| WO | 2005010410 A2 | 2/2005 |

* cited by examiner

AIRCRAFT TRANSPARENCY WITH PRESSURE SEAL AND/OR ANTI-STATIC DRAIN

CROSS REFERENCE TO RELATED APPLICATION

This application claims priority to U.S. Provisional Application No. 61/933,576, filed Jan. 30, 2014, which is herein incorporated by reference in its entirety.

BACKGROUND OF THE INVENTION

Field of the Invention

This invention relates generally to aircraft transparencies and, more particularly, to an aircraft transparency having a pressure seal incorporating integrated compression stops and/or having an anti-static drain assembly.

Technical Considerations

Commercial passenger aircraft have a pressure-tight fuselage to allow the interior of the aircraft to be pressurized during flight. In order to maintain the pressure integrity in the interior of the aircraft, as well as to prevent moisture penetration, aircraft transparencies (for example cockpit windshields and cabin windows) must remain tightly sealed against the aircraft body. However, during normal flight operations in which the aircraft travels from ground level to thousands of feet in the air and then back again, the aircraft fuselage expands and contracts due to the pressure differential between the interior of the aircraft and the external environment. In order to maintain a pressure-tight seal between the aircraft transparency and the aircraft fuselage during expansion and contraction of the fuselage, a flexible gasket or "pressure seal" is positioned between the transparency and the aircraft fuselage. When the transparency is attached to the fuselage, typically by bolts, the pressure seal is compressed between the outer edge of the transparency and the fuselage as torque is applied to the bolts. The flexible pressure seal helps to maintain a pressure-tight and moisture-proof seal between the fuselage and the transparency even as the fuselage expands and contracts during normal operations.

The torque applied to the bolts when attaching the aircraft transparency to the fuselage is very important. If the torque is too high, the pressure seal can become overly compressed and lose its range of expansion and contraction. If the torque is not high enough, the aircraft transparency may not be tightly sealed against the aircraft fuselage. Even if the correct amount of torque is applied, other factors may adversely impact upon the operation of the pressure seal. For example, the material of the pressure seal may lose flexibility and retain its compressed state (in flight state) after extended periods of time and temperature cycling. This can create a gap between the mating surfaces of the transparency and the fuselage, which can allow moisture penetration into the aircraft fuselage as well as a loss of pressure. Further, as the gasket material loses its flexibility over time, the bolts securing the transparency to the fuselage may deflect. This reduces the torque on the bolts and allows the bolts to become loose (conventionally referred to as "creep").

Another problem associated with conventional aircraft transparencies is precipitation static (known as "P-static"). Precipitation static is an electrical charge that builds up on the exterior of the aircraft transparency when the aircraft flies through certain environmental conditions, for example ice particles, rain, snow, and dust. Precipitation static builds up on the outside surface of the aircraft transparency until the static charge reaches a critical point, at which point it suddenly discharges to the adjacent metal aircraft fuselage. This sudden electrical discharge can disrupt aircraft communications, as well as navigation and surveillance radars, and can damage the aircraft radomes and transparencies. Precipitation static can also lead to "streamer noise" caused by charge buildup on nonconductive aircraft areas, such as windshields. This charge buildup and subsequent discharge can disrupt aircraft communications, particularly high UHF frequencies, and has the potential to cause interference with antennas close to the discharge source. Also, under certain conditions, a sudden static electrical discharge may damage the transparency, causing failure of the transparency heating system and/or partial loss of visibility through the transparency.

It would be advantageous to reduce or eliminate at least some of these problems associated with conventional aircraft transparencies. For example, it would be advantageous to provide a pressure seal for an aircraft transparency that reduces the likelihood of creep and/or torque loss during aircraft operations. For example, it would be advantageous to provide a method and/or structure to allow the precipitation static on the aircraft transparency to be drained away from the transparency before sudden discharge to reduce the disruption of aircraft communications and/or navigation and/or damage to the aircraft transparency.

SUMMARY OF THE INVENTION

An aircraft transparency assembly comprises an aircraft transparency comprising at least one ply having an outer surface and an extended portion. The assembly also comprises a pressure seal configured to engage the extended portion of the ply, wherein the pressure seal includes a pressure seal body and at least one integrated compression stop.

The transparency assembly can include an anti-static drain assembly comprising at least one flexible conductive element having a first end in electrical contact with the outer surface of the ply (or with an optional electrically conductive coating, if present) and a second end configured to contact the pressure seal.

The compression stop can comprise an annular member, for example an annular metallic member, encapsulated within the body. The pressure seal includes at least one through bore and the compression stop extends at least partly around the circumference of the through bore.

The pressure seal includes at least one conductive tab extending from the pressure seal body. This conductive tab can extend in any direction. For example, the conductive tab can extend radially inwardly from the pressure seal body. The conductive tab can be formed by a portion of the pressure seal body extending from the rest of the pressure seal body and can comprise conductive material incorporated into the extended portion.

The at least one ply includes an extended portion defining a lip and the pressure seal engages the extended portion.

A conductive coating can be provided over at least a portion of the outer surface of the ply. If the conductive coating is present, the first end of the conductive element is in electrical contact with the conductive coating and the second end of the conductive element is in electrical contact with a conductive tab of the pressure seal. At least a portion of the pressure seal is in electrical contact with a metal component of an aircraft body.

A pressure seal for an aircraft transparency comprises a body comprising at least one through bore and at least one compression stop encapsulated within the body and at least partly surrounding the at least one through bore. The compression stop can comprise an annular member, for example an annular metallic member.

The pressure seal includes at least one conductive tab extending from the pressure seal body. For example, the conductive tab can extend radially inwardly from the pressure seal body.

An aircraft transparency assembly comprises an aircraft transparency comprising at least one ply having an outer surface and an extended portion. A pressure seal is configured to engage the extended portion of the ply. The pressure seal includes at least one conductive tab. The transparency assembly further includes an anti-static drain assembly comprising at least one flexible conductive element having a first end in electrical contact with the outer surface of the ply (or with an optional electrically conductive coating, if present) and a second end in electrical contact with the conductive tab of the pressure seal.

The pressure seal includes a body and at least one compression stop encapsulated within the body. The compression stop can comprise an annular member, for example an annular metallic member. The pressure seal can include at least one through bore and the compression stop extends at least partly around the circumference of the through bore.

BRIEF DESCRIPTION OF THE DRAWINGS

The invention will be described with reference to the following drawing figures wherein like reference numbers identify like parts throughout.

DESCRIPTION OF THE PREFERRED EMBODIMENTS

Figure 1:
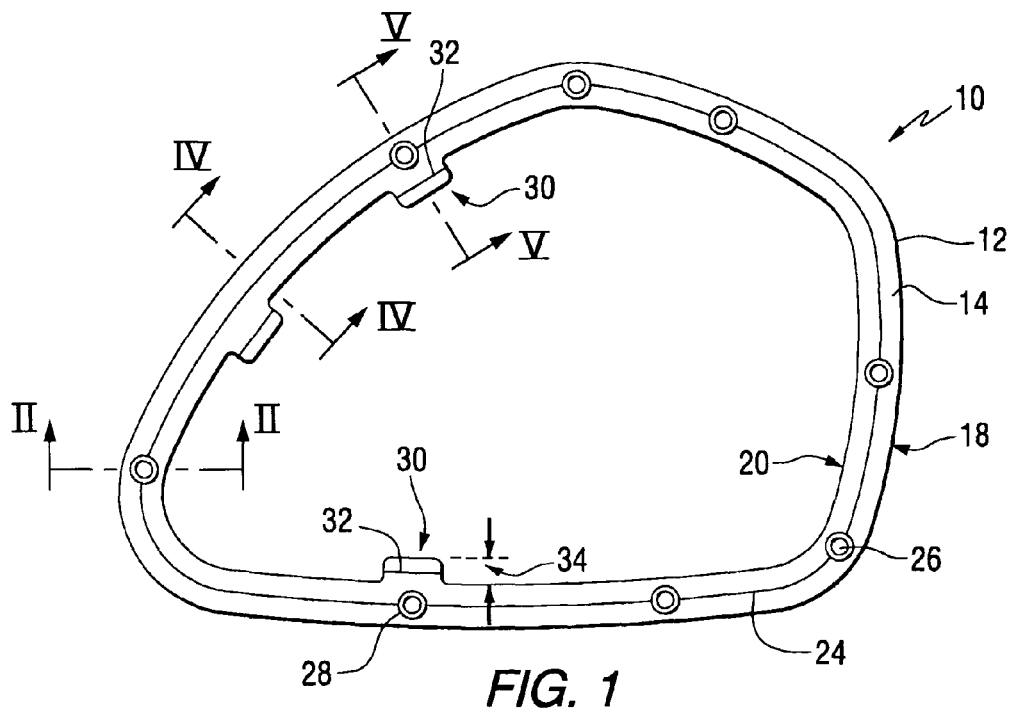
FIG. 1 is a plan view (not to scale) of a pressure seal of the invention.

As used herein, spatial or directional terms, such as "left", "right", "inner", "outer", "above", "below", and the like, relate to the invention as it is shown in the drawing figures. However, the invention can assume various alternative orientations and, accordingly, such terms are not to be considered as limiting. All numbers used in the specification and claims are to be understood as being modified in all instances by the term "about". All ranges disclosed herein are to be understood to encompass the beginning and ending range values and any and all subranges subsumed therein. The ranges disclosed herein represent the average values over the specified range. The term "over" broadly includes both "directly on" (i.e. in direct contact) or "above" (located above but not necessarily in direct contact with the underlying surface). The term "film" means a region of a desired or selected coating composition. A "layer" comprises one or more "films". A "coating" comprises one or more "layers". The terms "polymer" or "polymeric" include oligomers, homopolymers, copolymers, and terpolymers, e.g., polymers formed from two or more types of monomers or polymers. The term "visible light" means electromagnetic radiation having a wavelength in the range of 380 nm to 780 nm. The term "infrared radiation" means electromagnetic radiation having a wavelength in the range of greater than 780 nm to 100,000 nm. The term "ultraviolet radiation" means electromagnetic radiation having a wavelength in the range of 100 nm to less than 380 nm. All documents referred to herein are to be understood to be "incorporated by reference" in their entirety.

The invention will be discussed with reference to use with an aircraft transparency in the form of an aircraft lateral window. However, it is to be understood that the invention is not limited to use with aircraft lateral windows but could be practiced with other aircraft transparencies, for example aircraft windshields. Moreover, the invention could be practiced with transparencies for other vehicles (such as automobiles or water vessels) or with architectural transparencies. Therefore, it is to be understood that the specifically disclosed examples are presented simply to explain the general concepts of the invention and that the invention is not limited to the specifically disclosed examples.

The invention comprises, consists of, or consists essentially of, the following aspects of the invention, in any combination. Various aspects of the invention are illustrated in separate drawing figures herein. This is simply for ease of illustration and discussion. In the practice of the invention, one or more aspects of the invention shown in one drawing figure can be combined with one or more aspects of the invention shown in one or more of the other drawing figures.

A pressure seal 10 of the invention is shown in FIG. 1. The pressure seal 10 includes a body 12 having an outer surface 14 (upper surface), an inner surface 16 (lower surface), an outside peripheral edge 18, and an inside peripheral edge 20. The inside peripheral edge 20 defines an open inner area. By "outer surface" is meant the surface of the pressure seal 10 designed to face the exterior of the aircraft when the pressure seal 10 is installed in the aircraft. The "inner surface" is the surface designed to face the interior of the aircraft when the pressure seal 10 is installed in the aircraft.

The pressure seal 10 is made of a flexible and/or elastic material. Examples of suitable materials include elastic polymers. For example, thermoplastic or thermoset elastomers. For example, silicone polymers. For example, polydiorganosiloaxanes. The elastic material may also include reinforcing materials to improve the physical strength of the pressure seal 10. Examples of such reinforcing materials include silica and quartz.

Figure 2:
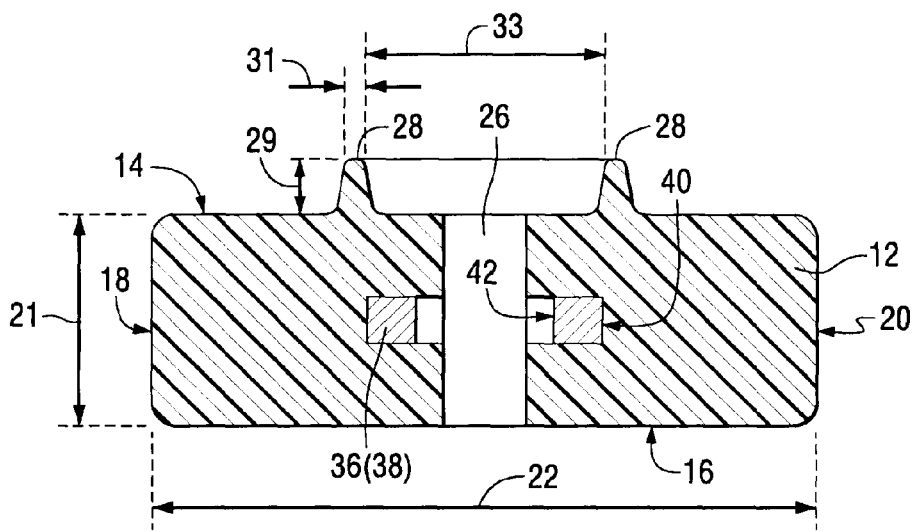
FIG. 2 is a side, sectional view (not to scale) taken along line II-II of FIG. 1.
Figure 3:
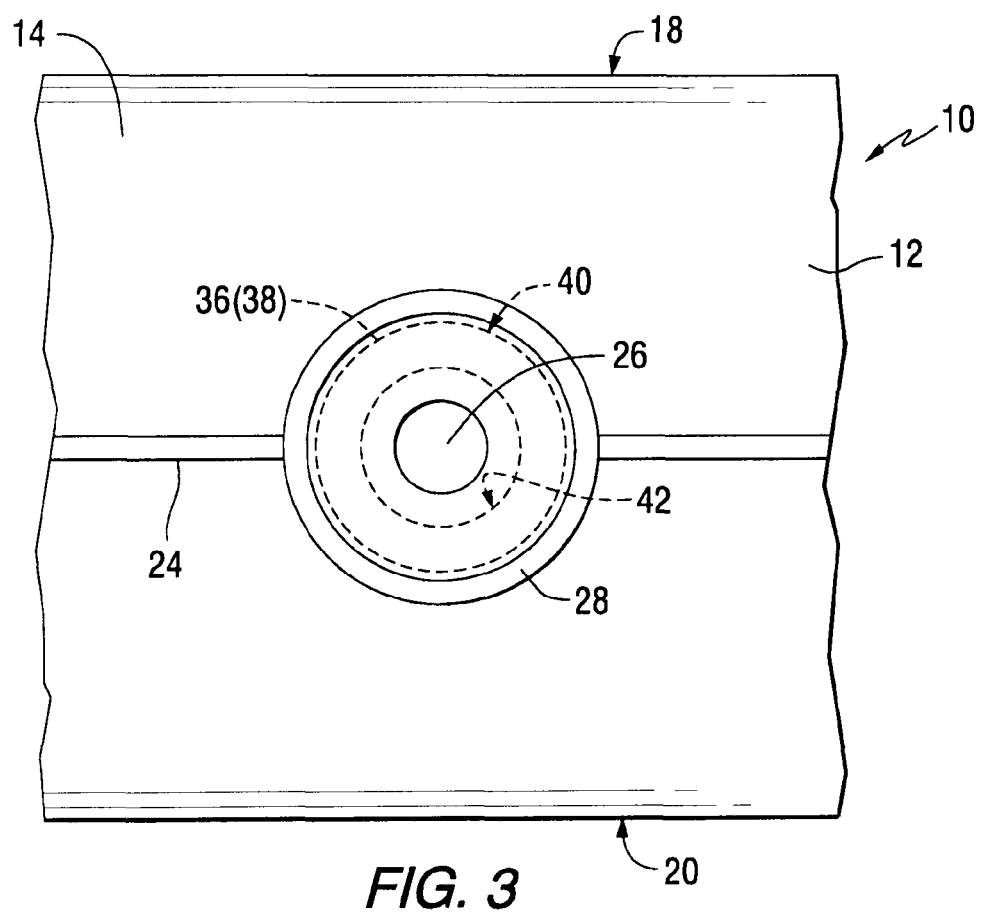
FIG. 3 is a plan view (not to scale) of a section of the pressure seal of FIG. 1.

The body 12 can be of any desired dimensions. For example, the body 12 can have a thickness 21 (FIG. 2) in the range of 0.01 inch (") to 0.1" (0.025 cm to 0.25 cm), such as 0.01" to 0.08" (0.025 cm to 0.2 cm), such as 0.01" to 0.06" (0.025 cm to 0.15 cm), such as 0.02" to 0.06" (0.05 cm to 0.15 cm), such as 0.03" to 0.05" (0.08 cm to 0.13 cm). For example, the body 12 can have a thickness 21 of 0034" (0.1 cm).

The body (not including the tab 30 described below) can have a width 22 the range of 0.4" to 2" (1 cm to 5 cm), such as 0.4" to 1.5" (1 cm to 3.8 cm), such as 0.5" to 1.5" (1.3 cm to 3.8 cm), such as 0.6" to 1.3" (1.5 cm to 3.3 cm), such as 0.6" to 1.2' (1.5 cm to 3 cm), such as 0.7" to 1.1" (1.8 cm to 2.8 cm), such as 0.7" to 1" (1.8 cm to 2.5 cm).

Figure 4:
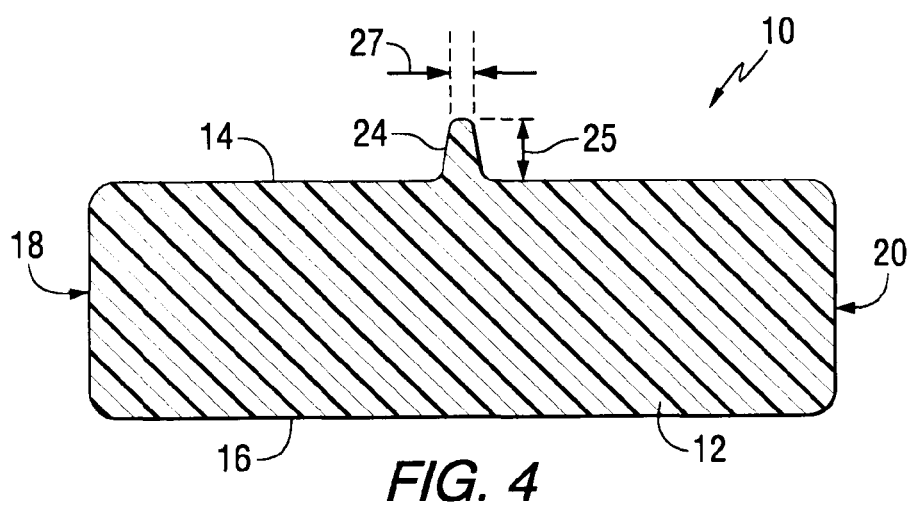
FIG. 4 is a side, sectional view (not to scale) taken along the line of IV-IV of FIG. 1.

The pressure seal 10 can include at least one band or first bead 24 formed on or projecting from the outer surface 14 (see FIGS. 1 and 4). The first bead 24 extends around at least a portion of the outer surface 14, as shown in FIG. 1. The first bead 24 improves sealing and compression when the pressure seal 10 is attached to an aircraft fuselage. The first bead 24 can be continuous or can be formed of disconnected portions extending around the outer surface 14.

The first bead 24 can have a height 25 (with reference to the outer surface 14) in the range of 0.03" to 0.1" (0.08 cm to 0.25 cm), such as 0.04" to 0.08" (0.1 cm to 0.2 cm), such as 0.05" to 0.07" (0.13 cm to 0.18 cm).

The first bead 24 can have a width 27 in the range of 0.02" to 0.1" (0.05 cm to 0.25 cm), such as 0.04" to 0.08" (0.1 cm to 0.2 cm), such as 0.06" to 0.07" (0.16 cm to 0.18 cm).

The pressure seal 10 includes a plurality of through bores 26. Bolts connecting the transparency and pressure seal 10 to the aircraft fuselage can extend through the through bores 26, as described in more detail below.

Another band or second bead 28 can be located on (for example, projecting from) the outer surface 14 at or adjacent the through bores 26. The second bead 28 can surround or at least partly surround the area adjacent the top of the through bores 26. For example, the second bead 28 can be an O-ring connected to the outer surface. Alternatively, the second bead 28 can be formed by a projection of the material of the outer surface 14 at or near the location of the through bores 26.

The second bead 28 can have a width 31 in the ranges as set forth above for the first bead 24.

The second bead 28 can have an inside diameter 33 in the range of 0.4" to 0.8" (1 cm to 2 cm), such as 0.5" to 0.7" (1.3 cm to 1.8 cm), such as 0.6" to 0.65" (1.5 cm to 1.65 cm).

The second bead(s) 28 can have a height 29 in the range as set forth above for the first bead 24. Optionally, the second bead 28 can have a height 29 in the range of 0.01" to 0.1" (0.025 cm to 0.25 cm), such as 0.02" to 0.08" (0.05 cm to 0.2 cm), such as 0.03" to 0.07" (0.08 cm to 0.18 cm). The heights of the first bead 24 and second bead(s) 28 can be the same or different.

The first bead(s) 24 and/or the second bead(s) 28 can be non-conductive.

The pressure seal 10 includes one or more conductive portions or tabs 30 extending from the pressure seal body 12. These conductive tabs 30 can extend in any direction to accommodate different aircraft transparency designs. In the example illustrated in FIG. 1, the conductive tabs 30 extend inwardly (e.g., radially inwardly) from the inside peripheral edge 20 of the body 12. For other transparency designs, the tabs 30 could project in a different direction, for example outwardly from the outside peripheral edge 18.

The conductive tabs 30 can be formed, for example, by discrete extensions or projections of portions of the body 12. These projections can include an electrically conductive material. For example, the tabs 30 can particles of one or more electrically conductive metals. Examples of suitable electrically conductive metals include silver, copper, aluminum, tin, steel, iron, zinc, and gold.

For example, during the molding process to form the pressure seal 10, the conductive material can be added to the portions of the elastomeric material forming the tabs 30 such that when the molding is complete the conductive material is incorporated into the elastomeric material forming the tabs 30 projecting from the body 12.

Optionally, the tabs 30 can be separate conductive members attached to the body 12. For example, the tabs 30 can be separate conductive members adhered to or connected to the body 12.

Optionally, the tabs 30 can be formed by projections of the body 12 at least partly covered in a conductive material, for example a layer of a conductive metal as described above.

One or more additional third beads 32 can be located on the conductive tabs 30. For example, on an upper surface of the conductive tab 30. The third bead(s) 32 are electrically conductive. The third bead 32 can be formed, for example, during the molding process for the conductive tabs 30 as described above. The conductive tabs 30 can be used to provide electrical contact between an optional anti-static drain assembly and the aircraft fuselage (e.g., the aircraft frame), as described in more detail below.

Figure 5:
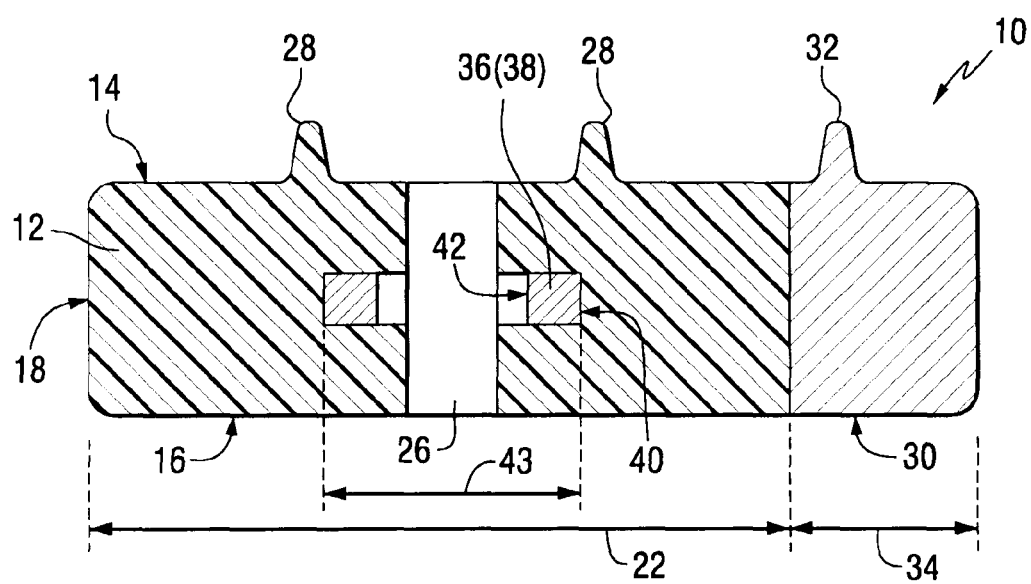
FIG. 5 is a side, sectional view (not to scale) taken along the line of V-V of FIG. 1.

The conductive tabs 30 extend from the pressure seal body 12 (see FIGS. 1 and 5). For example, the tabs 30 can extend radially inwardly from the inside peripheral edge 20 of the remainder of the pressure seal body 12. For example, the tabs 30 can extend a distance 34 (with respect to the inside peripheral edge 20 of the rest of the body 12) in the range of 0.05" to 0.5" (0.13 cm to 1.3 cm), such as 0.05" to 0.3" (0.13 cm to 0.8 cm), such as 0.05" to 0.12" (0.13 cm to 0.3 cm), such as 0.06" to 0.10" (0.15 cm to 0.25 cm).

As shown in FIGS. 1 to 5, the pressure seal 10 incorporates integrated compression stops 36. The compression stops 36 are formed by a material or member encased within, such as entirely within, the body 12. The compression stops 36 extend at least partially around the adjacent through bore 26. The compression stops 36 have a higher durometer than the material of the body 12. That is, the compression stops 36 are harder and/or less compressible than the material of the body 12. In the example illustrated in FIG. 2, the compression stop 36 is formed by an annular member 38 having an outer edge 40 defining an outer diameter and an inner edge 42 defining an inner diameter. The compression stop 36 can be molded into the body 12 during fabrication of the pressure seal 10.

The compression stops 36 can be metal. Examples of suitable metals include, steel, tin, brass, aluminum, iron, copper, and zinc. For example, the annular member 38 can be a steel member, such as a steel washer. The member 38 is completely encapsulated within the pressure seal body 12 such that no metal surface of the member 38 is exposed. Thus, when a fastener, such as a metal bolt, is inserted through the through bore 26, the outside surface of the bolt only contacts the elastomeric material of the body 12 and does not contact the member 38.

The material forming the compression stop 36 can be selected to provide a specifically desired durometer. The durometer can be selected to provide a desired final compression or torque when the pressure seal 10 is fastened to the aircraft.

The annular member 38 can have an outer diameter 43 in the range of 0.2" to 0.6" (0.5 cm to 1.5 cm), such as 0.2' to (0.5 cm to 1.3 cm), such as 0.3" to 0.4" (0.8 cm to 1 cm).

The annular member 38 can have an inner diameter 44 in the range of 0.1" to 0.5" (0.25 cm to 1.3 cm), such as 0.1" to 0.4" (0.25 cm to 1 cm), such as 0.1" to 0.3" (0.25 cm to 0.8 cm), such as 0.2" to 0.3" (0.5 cm to 0.8 cm).

Figure 6:
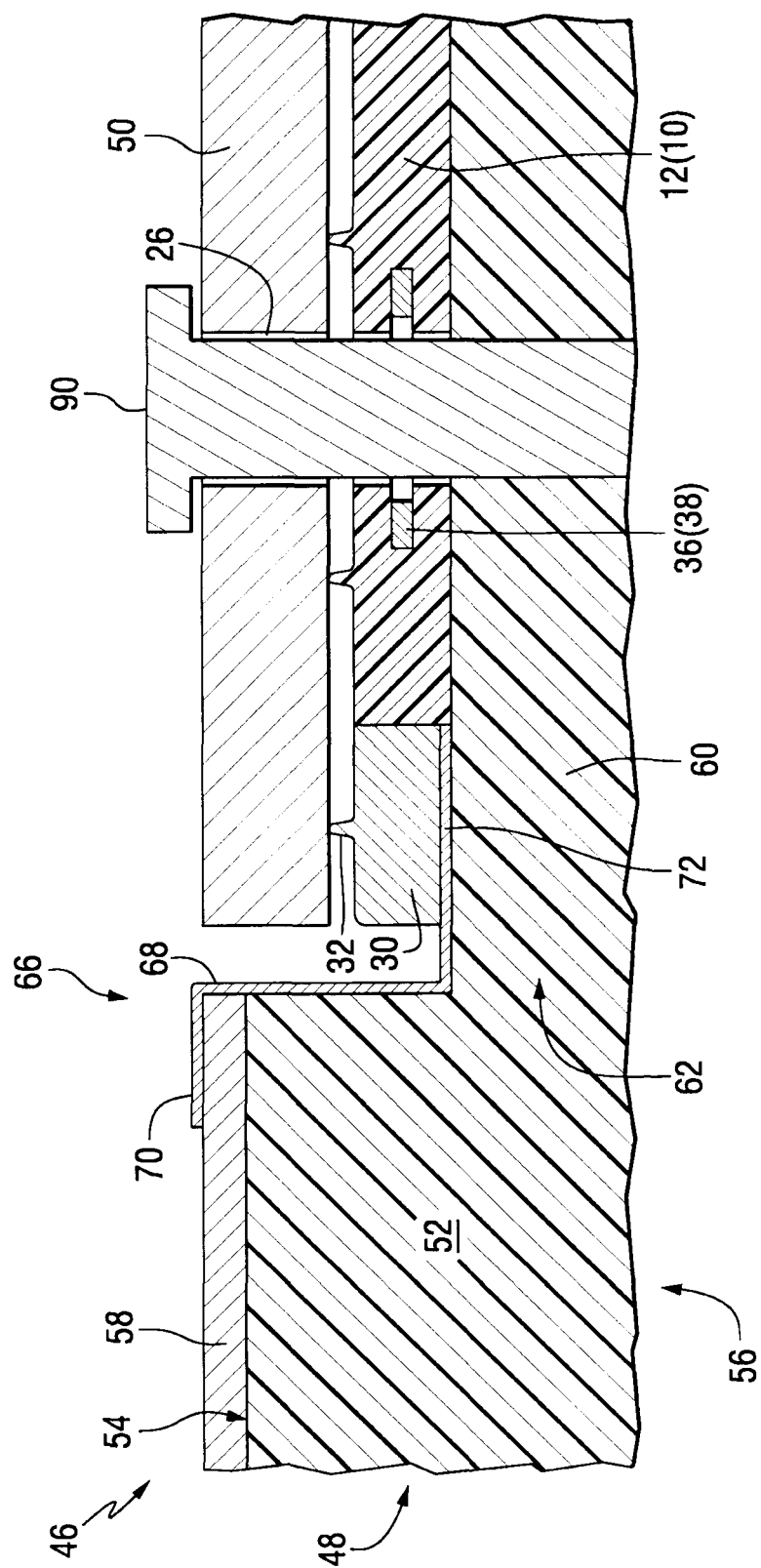
FIG. 6 is a side, sectional view (not to scale) of a perimeter portion of an aircraft transparency assembly (with portions of the transparency assembly removed for ease of description) showing an outer ply connected to an aircraft fuselage and illustrating an anti-static drain assembly of the invention.

FIG. 6 shows a peripheral portion of an aircraft transparency assembly 46 having a transparency 48 connected to an aircraft fuselage, such as to the aircraft framework 50, utilizing a pressure seal 10 of the invention. As will be appreciated by one skilled in the art, conventional aircraft transparencies typically include a plurality of transparent plies laminated together by polymeric interlayers. For simplicity of discussion, only the outer ply 52 of the aircraft transparency 48 is shown in FIG. 6. However, it is to be appreciated that the invention could be practiced on transparencies 48 having multiple plies. The outer ply 52 has an outer surface 54 facing the exterior of the aircraft and an inner surface 56 facing the interior of the aircraft.

Examples of suitable materials for the ply 52 (as well as other piles, if present) include, but are not limited to, plastic materials (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); stretched acrylic; glass, such as conventional soda-lime-silicate glass, borosilicate glass, leaded glass, low iron glass, lithium doped glass, or lithium alumina silicate glass (the glass can be annealed, heat-treated, or chemically tempered glass); or combinations of any of the above. For example, the outer ply 52 can be a polymeric material, such as stretched acrylic. Alternatively, the outer ply 52 can be a glass ply. In multiple-ply transparencies, the plies of the transparency can be of the same or different materials and can have the same or different physical and/or optical characteristics. For example, one or more of the plies can be transparent or translucent to visible light. By "transparent" is meant having visible light transmission at a wavelength of 550 nm of greater than 0% up to 100%. For example, transmission at a wavelength of 550 nm of at least 50%, such as at least 60%, such as at least 70%, such as at least 75%, such as at least 80%, such as at least 90%, such as at least 92%. For example, the visible light transmission at 550 nm can be at least 80%.

Alternatively, one or more of the plies can be translucent. By "translucent" is meant allowing electromagnetic energy (e.g., visible light having a wavelength of 550 nm) to pass through, but diffusing this energy such that objects on the side opposite the viewer are not clearly visible.

An optional conductive coating 58 can be located over the outer surface 54 of the outer ply 52. The conductive coating 58 can be located directly on the outer surface 54. Optionally, one or more optional additional coatings or layers can be located between the outer surface 54 and the conductive coating 58. Examples of such optional additional coatings include primers and silicon ion barrier layers.

The coating 58 can be a single layer or a multilayer coating. For example, the coating 58 can include one or more oxide layers, such as metal oxide layers. Examples of suitable oxide materials include oxides of zinc, tin, silicon, aluminum, zirconium, and mixtures and/or alloys thereof. The oxide material can include one or more dopants to increase electrical conductivity and/or adjust infrared and/or ultraviolet radiation transmission. Examples of dopants include iron, aluminum, tin, fluorine, antimony, zirconium, nickel, titanium, cobalt, chromium, and combinations thereof. For example, the coating 58 can include at least one of indium tin oxide, aluminum zinc oxide, or indium zinc oxide.

Optionally, the coating 58 can include one or more infrared reflective metal layers. For example, the conductive coating 58 can be a solar control coating having one or more infrared reflective metal layers and one or more oxide layers.

Optionally, the coating 58 can be or can include a protective coating, such as having one or more metal oxide layers, to provide mechanical and/or chemical protection to the underlying plies. For example, the protective coating can be a mixture of alumina and silica.

Optionally, the coating 58 can be or can include an "emp" coating to provide protection against damage caused by an electromagnetic pulse.

In the example shown in FIG. 6, the outer ply 52 includes an extended portion 60 having a thickness less than the remainder of the ply 52 and defining a lip 62 around the perimeter of the ply 52. The inner surface 16 of the pressure seal 10 engages this extended portion 60 such that when the transparency 48 is connected to the aircraft fuselage, such as to the framework 50, the pressure seal 10 is located between the extended portion 60 of the ply 52 and the aircraft fuselage, e.g., the aircraft framework 50. As shown in FIG. 6, the conductive tab 30 of the pressure seal 10 is in electrical contact, for example direct contact, with the metallic aircraft framework 50.

The transparency assembly 46 can include an optional anti-static drain assembly 66 of the invention. The anti-static drain assembly 66 includes a flexible conductive element 68 extending from the outer surface 54 of the ply 52 to the conductive tab 30 of the pressure seal 10. An outer end 70 of the conductive element 68 is in electrical contact with the outer surface 54 of the ply 52 (or with the conductive coating 58, if present). An inner end 72 of the conductive element 68 is in electrical contact with the conductive tab 30 of the pressure seal 10. The conductive element 68 provides an electrical connection (electrical drain) between the outer surface 64 of the ply 52 (for example, the conductive coating 58, if present) and the conductive tab 30. Since the conductive tab 30 is in electrical contact (such as direct contact) with the metallic aircraft fuselage, such as with the metallic framework 60, the conductive element 68 provides an electrical path or drain from the conductive coating 58 (or outer surface 54 of the ply 52 if the conductive coating 58 is not present) to the conductive tab 30 and then to the metallic aircraft framework 50. This allows for the continuous discharge or drainage of electrical charge (P-static) from the outer surface 54 (or the conductive coating 58, if present) to the aircraft framework 50. This reduces or prevents the buildup of precipitation static on the aircraft transparency 48.

The conductive element 68 can be a flexible electrically conductive member. For example, the conductive element 68 can be a flexible electrically conductive tape. The tape can be easily applied (adhered) to the aircraft transparency 48. Examples of suitable conductive tapes include CHO-FOIL, CHO-FAB, and SHIELD WRAP tape, commercially available from the Chomerics Company of Woburn, Mass. Due to the flexibility of the tape, the outer end 70 of the tape can be placed easily in contact with the conductive coating 58 (or the outer surface 54 of the ply 52 if the conductive coating 54 is not present) and the inner end 72 of the tape can extend along at least a part of the extended portion 60 of the ply 52. When the pressure seal 10 is mated with the extended portion 60, the bottom (inner side) of the conductive tab 30 is in electrical contact with the inner end 72 of the tape and the conductive third bead 32 of the conductive tab 30 is in electrical contact with the metal aircraft fuselage, such as with the aircraft framework 50.

Figure 7:
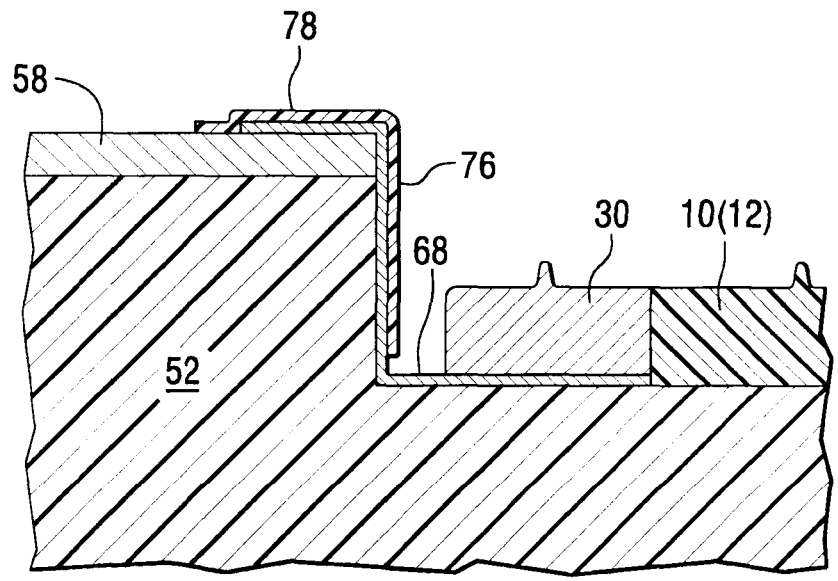
FIG. 7 is a side, sectional view (not to scale) of the left side of FIG. 6 showing a moisture barrier (Z-strap) at the location of the conductive tab of the pressure seal.
Figure 8:
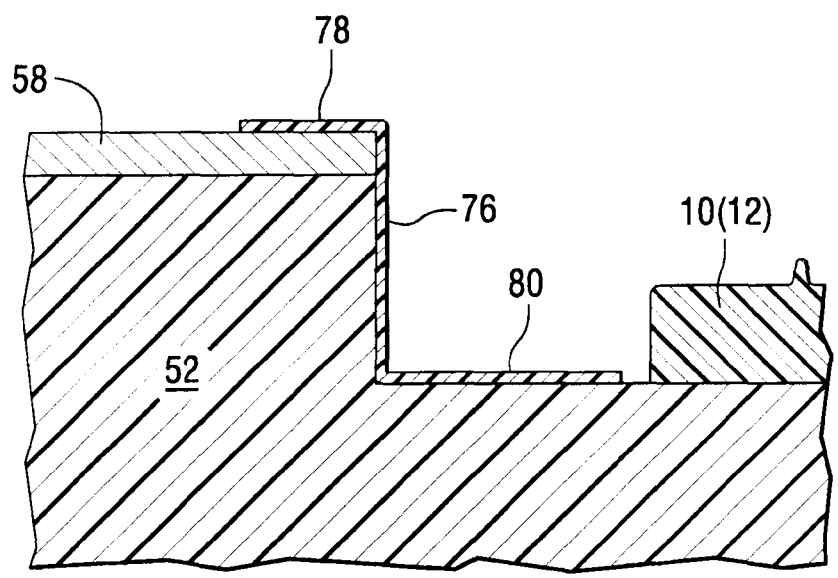
FIG. 8 is a side, sectional view (not to scale) of the moisture barrier (Z strap) at a location of the pressure seal body without the conductive tab.
Figure 9:
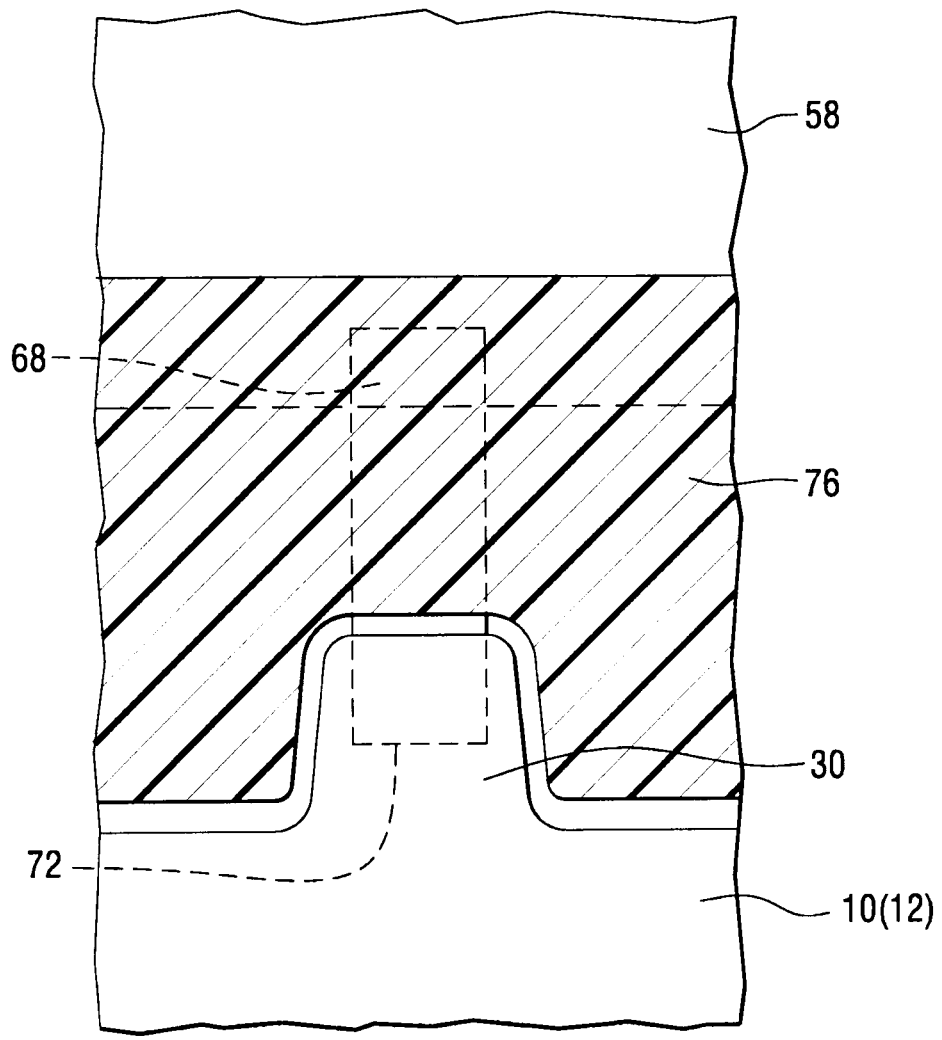
FIG. 9 is a plan view of FIG. 7.

As shown in FIGS. 7 to 9, the transparency assembly 46 can include one or more moisture barriers 76 to help prevent moisture from penetrating the transparency assembly 46. The moisture barrier 76 can be a conventional flexible fiberglass "Z-strap" having an outer portion 78 connected to (for example, adhered to) the outer surface 54 of the outer ply 52, such as to the conductive coating 58, if present. As shown in FIG. 8, in the areas where the conductive tabs 30 are not present, an inner portion 80 of the moisture barrier 76 can be adhered to the outer surface of the extended portion 60. As shown in FIGS. 7 and 9, at the locations of the conductive tabs 30, the outer portion 78 of the Z-strap can overlay at least a portion of the conductive element 68 to cover and protect the conductive element 68. The inner portion 80 of the fiberglass strap can have a notch or cut-out region to accommodate the conductive element 68 (e.g., conductive tape) so that the inner portion 80 of the strap does not overlie the inner end 72 of the conductive element 68 adjacent the bottom of the conductive tab 30 so as not to interfere with the electrical connection between the conductive element 68 (e.g., conductive tape) and the conductive tab 30 of the pressure seal 10.

The pressure seal 10 of the invention provides several benefits over conventional aircraft transparency assembly construction. For example, as shown in FIG. 6, when bolting the transparency 48 to the metal fuselage, the bolts 90 extend through the through bores 26 in the seal body 12. As torque is applied to tighten the bolts 90, the bolts 90 apply a compression force against the compression stops 36. The increased durometer of the compression stops 36 (compared to the durometer of the material of the rest of the pressure seal body 12) allows more torque to be applied than would be possible in the absence of the compression stops 36 without damaging the seal body 12. The areas of increased durometer formed by the compression stops 36 are located only at the positions of the through bores 26 (where the bolts 90 are inserted). This means the remaining portions of the body 12 can be of a lower durometer material, which enhances the elasticity and flexibility of the rest of the body 12 during normal operation. The compression stops 36 decrease the previous problems associated with loss of torque due to over-compression of the seal.

The antistatic drain assembly 66 also provides several advantages. As precipitation static builds up on the outer surface 54 of the outer ply 52, this electrical charge is continuously drained from the outer ply 52, through the conductive element 68, to the metal aircraft framework 50. Thus, the electrical charge does not build up on the transparency 48 to previous levels before suddenly discharging to the adjacent metal skin of the aircraft. This prevents or reduces damage to the transparency 48 and adjacent equipment as well as helps to prevent interference with the aircraft communication and navigation equipment.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the breadth of the appended claims and any and all equivalents thereof.

The invention claimed is:

1. An aircraft transparency assembly, comprising:
   an aircraft transparency comprising at least one ply having an outer surface and an extended portion, wherein the extended portion has a thickness less than a remainder of the at least one ply and defines a lip around a perimeter of the at least one ply; and
   a pressure seal configured to engage the extended portion of the at least one ply, wherein the pressure seal includes a pressure seal body and at least one integrated compression stop.

2. The transparency assembly of claim 1, further including an anti-static drain assembly comprising at least one flexible conductive element having a first end in electrical contact with the outer surface of the ply or an optional conductive coating, and a second end configured to contact the pressure seal.

3. The transparency assembly of claim 2, including a conductive coating over at least a portion of the outer surface of the at least one ply.

4. The transparency assembly of claim 3, wherein the first end of the conductive element is in electrical contact with the conductive coating.

5. The transparency assembly of claim 2, wherein the second end of the conductive element is in electrical contact with a conductive tab of the pressure seal.

6. The transparency assembly of claim 2, including a flexible moisture barrier comprising an outer portion over at least a portion of the outer surface of the at least one ply, and an inner portion connected to the extended portion and/or located over at least a portion of the conductive element.

7. The transparency assembly of claim 6, wherein the inner portion of the moisture barrier includes a cut-out region.

8. The transparency assembly of claim 1, wherein the compression stop comprises a metallic annular member encapsulated within the pressure seal body.

9. The transparency assembly of claim 1, wherein the pressure seal includes at least one first bead extending at least partly around the pressure seal.

10. The transparency assembly of claim 1, wherein the pressure seal includes at least one through bore and the compression stop extends at least partly around the through bore.

11. The transparency assembly of claim 10, wherein the pressure seal includes a second bead adjacent the through bore.

12. The transparency assembly of claim 1, wherein the pressure seal includes at least one conductive tab.

13. The transparency assembly of claim 12, wherein the at least one conductive tab comprises an extended portion of pressure seal body, and further comprises conductive material incorporated into the extended portion of the pressure seal body defining the tab.

14. An aircraft transparency assembly, comprising:
   an aircraft transparency comprising at least one ply having an outer surface and an extended portion, wherein the extended portion has a thickness less than a remainder of the at least one ply and defines a lip around a perimeter of the at least one ply, wherein the at least one ply is selected from the group consisting of glass and polymeric material;
   a conductive coating located over at least a portion of the outer surface of the at least one ply;
   a pressure seal configured to engage the extended portion of the at least one ply, wherein the pressure seal includes a body including an inside peripheral edge, at least one conductive tab, and at least one through bore;
   at least one compression stop encapsulated within the body, wherein the compression stop at least partly surrounds the through bore; and
   an anti-static drain assembly comprising at least one flexible conductive element having a first end in electrical contact with the conductive coating, and a second end in electrical contact with the at least one conductive tab of the pressure seal.

15. A pressure seal for an aircraft transparency assembly, comprising:
   a body comprising at least one through bore;
   at least one compression stop encapsulated within the body and at least partly surrounding the at least one through bore, wherein the at least one compression stop has a higher durometer than the body; and
   at least one conductive tab extending from the pressure seal body.

16. The pressure seal of claim 15, wherein the compression stop comprises a metallic annular member.

17. The pressure seal of claim 15, wherein the at least one conductive tab comprises a radially inwardly extending portion of the pressure seal body, and further comprises conductive material incorporated into the extending portion of the pressure seal body defining the conductive tab.

18. The pressure seal of claim 15, wherein the at least one conductive tab includes a conductive bead extending therefrom.

19. The pressure seal of claim 15, wherein the compression stop comprises a steel washer.

* * * * *